Sept. 29, 1970  MANABU KASHIHARA  3,530,732
VARIABLE-SPEED TRANSMISSION OF FRICTION TYPE
Filed July 19, 1968  3 Sheets-Sheet 1

INVENTOR.
Manabu Kashihara
BY
Pierce, Scheffler & Parker
Attorneys

United States Patent Office 3,530,732
Patented Sept. 29, 1970

3,530,732
VARIABLE-SPEED TRANSMISSION OF FRICTION TYPE
Manabu Kashihara, Uji, Kyoto, Japan, assignor to Shimpo Kogyo Kabushiki Kaisha (Shimpo Kogyo Co. Ltd.), Kyoto, Japan, a corporation of Japan
Filed July 19, 1968, Ser. No. 746,030
Claims priority, application Japan, July 24, 1967, 42/47,506, 42/47,507, 42/47,508
Int. Cl. F16h 15/08, 15/52
U.S. Cl. 74—199                6 Claims

ABSTRACT OF THE DISCLOSURE

A variable speed transmission having rollers with conical surfaces each engaging, at varying effective radii, alternate disc wheels of two different sets, one of which is a driving set. In order to compensate for axial movement of the disc wheels relative to the rollers, the rollers may be deflected from a position normal to the axis of the shaft on which they are mounted.

---

This invention relates to a variable-speed transmission in which a plurality of thin rollers with conical surfaces on both sides and a plurality of disc wheels are provided. The thin rollers with conical surfaces on both sides frictionally engage with the disc wheels and speed is varied by shifting the rollers to vary their effective radii. The power transmitting capacity of this type of transmission can be raised by increasing the number of thin rollers. Further, speed range of this type of transmission can be extended wider by engaging the roller over two disc wheels.

It is a principal object of the present invention to provide a transmission of the above mentioned type in which an increased power transmitting capacity and an extended speed range are obtained reasonably.

It is another object of the present invention to provide a transmission of the above mentioned type which is small and light in weight.

The foregoing as well as other objects and advantages will become more apparent from the following description of various embodiments of the present invention when read in connection with the accompanying drawings in which.

Figure 1:
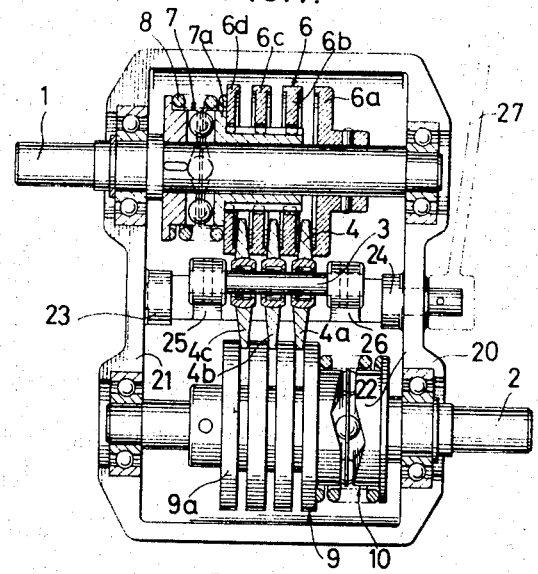
FIG. 1 is a horizontal sectional view of a variable-speed transmission according to one embodiment of the present invention.
Figure 3:
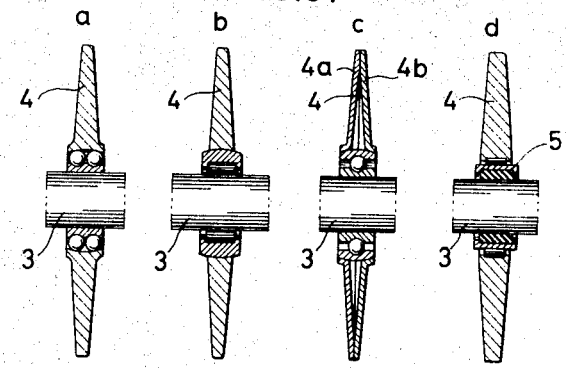
FIG. 3 is sectional view which shows various self-aligning mountings of thin rollers in the transmission according to the present invention.

Referring to FIG. 1, an input shaft 1, an output shaft 2 and an intermediate shaft 3 are arranged in a parallel spaced relation. A plurality of thin rollers 4 with conical surfaces or both sides are supported by the intermediate shaft 3. The thin rollers 4 can move axially along the intermediate shaft 3, and further, each of these rollers 4 is supported in a self-aligning state on the intermediate shaft 3. This axially movable and self-aligning support of thin rollers 4 is the first principal feature of the speed-transmission according to the present invention. The self-aligning support of rollers 4 can be put into practice in various ways. FIG. 3 shows several examples of the self-aligning support of rollers 4. FIGURE 3a shows a case where the roller 4 is supported in the same way as employed for a self-aligning ball bearing of double rows type, FIG. 3b shows a case where the roller 4 is supported by a spherical outer surface of the roller bearing, FIG. 3c shows a case where the roller 4 is composed of two plate members 4a, 4b and is supported by a spherical outer surface of a ball bearing of single row type, and FIG. 3d shows a case where the roller 4 is supported by a roller bearing and a rubber ring or sleeve 5. The roller 4 is able to incline suitably. It will be understood that two rollers 4 except the middle one may incline slightly.

A plurality of disc wheels 6 are supported and driven by the input shaft 1. Among these disc wheels 6, the disc wheel 6a is fixed to the input shaft 1, but the remaining disc wheels 6b, 6c, 6d can move axially so as to permit advancing of the rollers 4 into spaces between neighboring disc wheels 6. There is provided a contact pressure generating device 7 of the ball-and-cam type consisting of two cam members and balls arranged between them. One cam member 7a which is supported rotatably by the input shaft 1 has a splined sleeve portion with which the disc wheels 6b, 6c, 6d engage. There is provided further a spring 8 for creating initial contact pressure. A plurality of disc wheels 9 and a contact pressure generating device 10 of ball-and-cam type are similarly provided on the output shaft 2. However, the contact pressure generating device 10 is arranged on the right side, and the disc wheel 9a which is fixed to the output shaft 2 is arranged on the left side. By this reverse arrangement, the angle of inclination of the rollers 4 varies within a relatively small range. The contact pressure generating devices 7, 10 may be substituted by suitable springs.

Each of the disc wheels 6, 9, except the end ones, frictionally engages with two neighboring rollers 4. This is the second principal feature of the speed-transmission according to the present invention, and this second principal feature, in cooperation with the first principal feature already mentioned, that is to say, the self-aligning mounting of rollers 4, brings various advantages explained hereinafter.

The intermediate shaft 3 is attached to a pair of arms 25, 26 extending from a shaft which is supported rotatably by bosses 23, 24 on the casing 20. The shaft is turned by a handle 27. And, when the handle 27 is turned (see FIG. 2) the rollers 4 advance into or retract from the disc wheels 6, 9 respectively causing variation of effective radii. Speed change is carried out by a double function, one of which is consisted by the disc wheels 6 and the rollers 4, and the other of which is consisted by the rollers 4 and the disc wheels 9. In this specification, the speed change by the above double function is expressed by a term "serial speed change." In the case of previously known types for carrying out the above said serial speed change, each of the above two functions is constructed so as to have an arrangement in which each roller frictionally engages with two independent two disc wheels. In the heretofore known type the disc wheels and the rollers are arranged as follows (disc wheel-roller-disc wheel)-gap-(disc wheel-roller-disc wheel)-gap etc.-(disc wheel-roller-disc wheel)-gap. And, when the rollers advance into or retract from the spaces between two neighboring disc wheels, the amount of the gap above mentioned varies. In that case, it will be understood that the disc wheels and the rollers must be sufficiently thick to withstand bending moment acting on them, and that a larger number of disc wheels must be used compared with the transmission according to the present invention. In the case of the present transmission by the adoption of the self-aligning mounting of rollers 4, the disc wheels 6, 9 and the rollers 4 are arranged in an alternating arrangement, without gaps i.e. disc-roller-disc wheel-roller-disc wheel etc. Accordingly, except for the end disc wheels, the rollers and the disc wheels can be manufactured as thinner members compared with those of the previously known type. This fact means that the transmission according to the present invention is relatively small and light in weight, and that the capacity of the transmission according to the present invention can be raised easily by increasing the number of disc wheels and rollers. Further, in the case of the present transmission contact pressure between the rollers and the disc wheels is uniform owing to the above mentioned serial alternating arrangement. And this uniform contact pressure brings a high mechanical efficiency.

Figure 4:
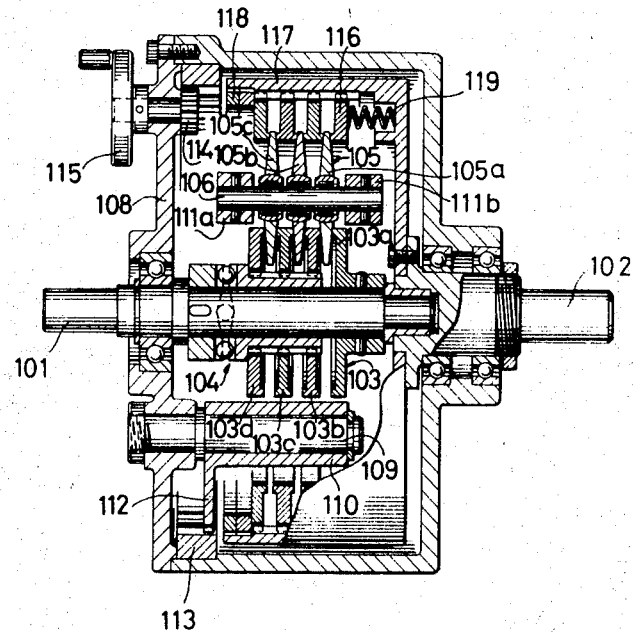
FIG. 4 is a horizontal section view of another embodiment of the present invention.
Figure 5:
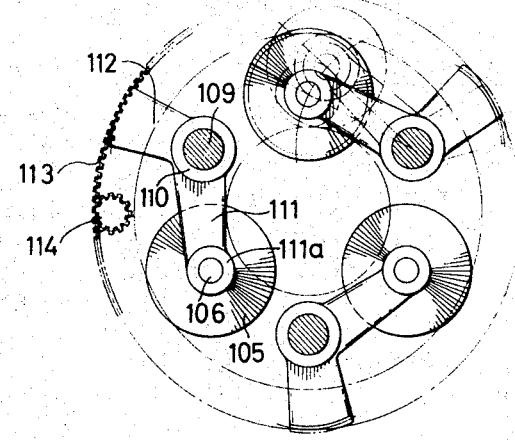
FIG. 5 is a view showing the mechanism for shifting the thin rollers in the transmission shown in FIG. 4.

Referring now to FIG. 4 and FIG. 5, an input shaft 101 and an output shaft 102 are arranged coaxially. A plurality of disc wheels 103 are provided on the input shaft 101 in the same way as employed for the disc wheels 6 shown in FIG. 1. One end disc wheel 103a is fixed to the input shaft 101, and a contact pressure generating device 104 of ball-and-cam type is also provided. The disc wheels 103a–103d correspond to the disc wheels 6a–6d respectively. A plurality of rollers 105 are mounted on each of three intermediate shafts 106 in the same way as employed for the rollers 4. As shown in FIG. 5, and FIG. 4 each intermediate shaft 106 is connected to end portions 111a, 111b of a pair of arms 111 extended from a sleeve 110. Each sleeve 110 is supported rotatably by a pin 109 which extends from the casing 108. A sector gear 112 extends from the sleeve 110 and meshes with an internal gear 113 supported rotatably by the casing 108. The internal gear 113 also meshes with a pinion 114. This pinion 114 is turned by a handle 115. When the handle 115 is turned, the intermediate shafts 106 shift the rollers 105 to vary their effective radii.

A plurality of disc wheels 116 which correspond to the disc wheels 9 are provided. These disc wheels 116 are those of annular or ring shape and at their peripheral splined portions engage with a splined internal surface of a drum 117 attached to the output shaft 102 concentrically. Ring pieces 118 are screwed into the end portion of drum 117 to avoid the running out of disc wheels 116, and further, a spring 119 is provided to create contact pressure. This spring 119 corresponds to the contact pressure generating device 10. (FIG. 1).

Figure 6:
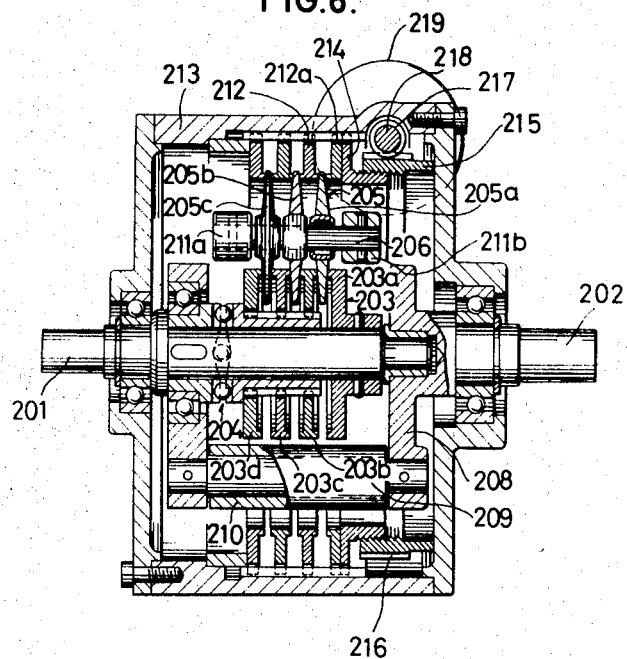
FIG. 6 is a horizontal sectional view of still another embodiment of the present invention.
Figure 7:
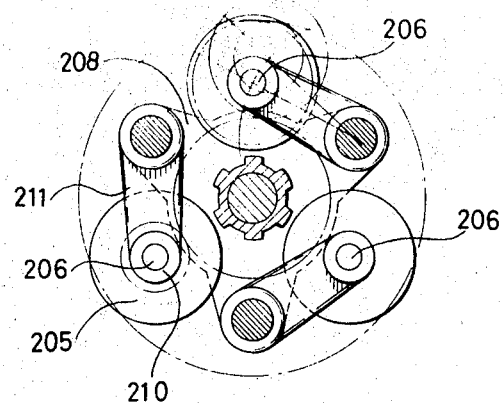
FIG. 7 is a view showing the mechanism for shifting thin rollers in the transmission shown in FIG. 6.

The variable-speed transmission shown in FIG. 6 and FIG. 7 is provided with an input shaft 201, an output shaft 202, disc wheels 203 (203a–203d), a contact pressure generating device 204, rollers 205 (205a–205c) and three intermediate shafts 206 which correspond to those of the transmission shown in FIG. 5. The difference between the transmission shown in FIG. 4 and FIG. 6 is in that the ring shaped disc wheels 212 are non-rotatable ones and the rollers 205 are planets. And, in the case of transmission shown in FIG. 6, a carrier 208 is provided integrally with the output shaft 202. Three shafts 209 are attached to the carrier 208. Each of these shafts 209 supports a sleeve 210 rotatably. A pair of arms 211 are extended from the sleeve 210. The intermediate shaft 206 is supported by the ends 211a, 211b of the arms 211. Speed change operation is achieved by an operating device consisted of a handle 219 attached to a shaft 218 on a casing 213, a worm 217 on the shaft 218, a worm wheel 215 meshing with the worm 217 and a feed member 214 screwed into the worm wheel 215.

Figure 2:
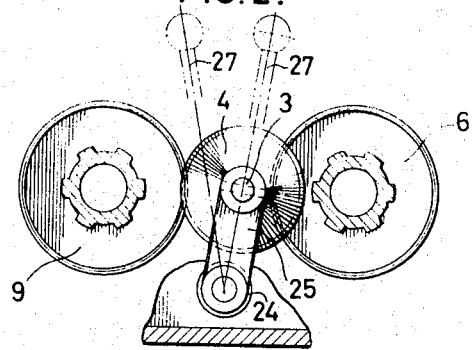
FIG. 2 is a side view which shows a thin roller, two disc wheels and the roller shifting device of the transmission shown in FIG. 1.

The transmission shown in FIG. 4–FIG. 7 are also constructed to possess the first and the second features explained referring to FIG. 1–FIG. 3. Accordingly, advantages of these transmission are the same with those of the transmission shown in FIG. 1 and FIG. 2 except coaxial arrangement of the input shaft and the output shaft.

I claim:

1. In a variable speed transmission in which a plurality of rollers having conical surfaces mounted on and rotatable with a shaft therefor frictionally engage alternate axially yieldable disc wheels and in which the effective radii between the rollers and the disc wheels may be varied to obtain variable speed transmission, the improvement comprising means for mounting said rollers on the shaft to permit deflection of said rollers away from a position normal to the shaft axis, whereby the rollers may be deflected to accommodate variable width between the axially yieldable disc wheels when varying the effective radii between the rollers and the disc wheels.

2. A variable speed transmission comprising a driving shaft, a driven shaft parallel thereto, a set of spaced disc wheels rotatable with each of said driving shaft and said driven shaft, means for resiliently urging each of said sets of disc wheels axially on their respective shafts in opposite directions, at least one intermediate shaft extending parallel to the axes of said driving and driven shafts, a plurality of rollers having conical surfaces, axially movably mounted on, and rotatable with said at least one intermediate shaft, each of said rollers alternating with and engaging adjacent spaced disc wheels of each set, means for mounting said rollers on said intermediate shaft to permit deflection of said rollers away from a position normal to the shaft axis and means for moving said at least one intermediate shaft and rollers thereon toward one of the sets of disc wheels and simultaneously away from the other of said sets, whereby the rollers engage said disc wheels at varying effective radii for transmission of movement from the driving shaft to the driven shaft.

3. A variable speed transmisison as claimed in claim 2 wherein said driving shaft and said driven shaft are disposed coaxially and one of said sets of disc wheels is annular.

4. A variable speed transmission as claimed in claim 2 wherein said deflection permitting means comprises a spherical bearing surface between each roller and the intermediate shaft on which it is mounted.

5. A variable speed transmission as claimed in claim 2 wherein said deflection permitting means includes a resilient sleeve between each roller and the intermediate shaft on which it is mounted.

6. A variable speed transmission as claimed in claim 2 wherein there is one intermediate shaft and the driving shaft, intermediate shaft and driven shaft are in spaced parallel relation.

References Cited

UNITED STATES PATENTS

| | | | |
|---|---|---|---|
| 2,841,019 | 7/1958 | Beier | 74—199 |
| 3,099,927 | 8/1963 | Anderson | 74—796 |
| 3,151,717 | 10/1964 | Kaptur et al. | 74—796 X |
| 3,387,507 | 6/1968 | De Castelet | 74—796 |

ARTHUR T. McKEON, Primary Examiner

U.S. Cl. X.R.

74—796